(12) United States Patent
Bluemm et al.

(10) Patent No.: US 10,151,654 B2
(45) Date of Patent: Dec. 11, 2018

(54) GUIDE CARRIAGE WITH A SENSORY LAYER ON THE RACEWAY INSERT

(71) Applicant: Robert Bosch GmbH, Stuttgart (DE)

(72) Inventors: Frank Bluemm, Lebenhan (DE); Christoph Janssen, Wuerzburg (DE); Marco Stock, Roethlein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/603,840

(22) Filed: May 24, 2017

(65) Prior Publication Data
US 2017/0356817 A1    Dec. 14, 2017

(30) Foreign Application Priority Data
Jun. 8, 2016 (DE) .................. 10 2016 210 109

(51) Int. Cl.
| | | |
|---|---|---|
| *G01L 5/00* | (2006.01) | |
| *F16C 29/06* | (2006.01) | |
| *F16C 41/00* | (2006.01) | |
| *F16C 33/61* | (2006.01) | |

(52) U.S. Cl.
CPC ........ *G01L 5/0019* (2013.01); *F16C 29/0604* (2013.01); *F16C 29/0645* (2013.01); *F16C 41/00* (2013.01); *F16C 33/61* (2013.01); *F16C 2202/36* (2013.01); *F16C 2233/00* (2013.01)

(58) Field of Classification Search
CPC .. F16C 29/0645; F16C 41/00; F16C 2202/36; F16C 2233/00; G01L 5/0019

USPC ................................................. 384/8
See application file for complete search history.

(56) References Cited

U.S. PATENT DOCUMENTS

| | | | |
|---|---|---|---|
| 8,251,589 B2 * | 8/2012 | Albert .................. | F16C 29/00 384/56 |
| 9,404,539 B2 * | 8/2016 | Elting .................. | F16C 33/76 |

FOREIGN PATENT DOCUMENTS

| | | |
|---|---|---|
| DE | 10 2008 051 682 A1 | 4/2010 |
| EP | 2 110 571 B1 | 10/2009 |
| EP | 2 952 761 A1 | 12/2015 |

* cited by examiner

*Primary Examiner* — James Pilkington
(74) *Attorney, Agent, or Firm* — Maginot, Moore & Beck LLP (57) ABSTRACT

A guide carriage for use with a guide rail includes a main body and a separate raceway insert. A first carriage raceway that extends parallel to a longitudinal axis is disposed on the raceway insert. The first carriage raceway is assigned a first lateral face, which is disposed on that side of the raceway insert that is opposite the first carriage raceway. The first carriage raceway is assigned a row of rolling bodies capable of being brought into rolling engagement with the first carriage raceway and an assigned first rail raceway on the guide rail. The raceway insert is supported in a force-transmitting manner on the main body by way of the first lateral face. The raceway insert has a sensory layer which in the direction of the longitudinal axis extends across at least 80% of the length of the raceway insert.

11 Claims, 7 Drawing Sheets

GUIDE CARRIAGE WITH A SENSORY LAYER ON THE RACEWAY INSERT

This application claims priority under 35 U.S.C. § 119 to patent application number 10 2016 210 109.9, filed on Jun. 8, 2016 in Germany, the disclosure of which is incorporated herein by reference in its entirety.

BACKGROUND

The disclosure relates to a guide carriage.

A guide carriage which is a component part of a linear roller bearing which moreover comprises a guide rail is known from DE 10 2008 051 682 A1. The guide carriage has a main body and four raceway inserts. A carriage raceway for the roller-shaped rolling bodies which are installed in a force-transmitting manner between the guide rail and the guide carriage is provided on each raceway insert. A sensor which is configured in the form of a piezoceramic element is installed between the raceway insert and the main body. The sensor herein is received in breakouts of a metal sheet, wherein the metal sheet is installed in a force-transmitting manner between the raceway insert and the main body. On account thereof, the sensor is distressed such that a breakage of the piezoceramic element does not have to be expected. Since the sensor transmits and thus measures only a minor part of the total force to the guide carriage, the measuring accuracy of said sensor as compared to the total force that acts from the outside on the guide carriage drops.

SUMMARY

One advantage of the present disclosure lies in that the force which acts from the outside on the guide carriage can be measured in a particularly accurate manner. Moreover, the respective sensor is particularly immune to damage. Furthermore, any non-uniform distribution of load along the raceway insert does not have any negative effect on the measured result.

According to the following description, it is proposed that the raceway insert is provided with at least one sensory layer which in the direction of the longitudinal axis extends across at least 80% of the length of the raceway insert which is supported in a force-transmitting manner on the main body. The sensory layer preferably extends across the entire length of the raceway insert which is supported in a force-transmitting manner on the main body.

The first lateral face is preferably configured so as to be planar. Said first lateral face is aligned so as to be preferably parallel with the longitudinal axis. The raceway insert at those ends thereof that in the direction of the longitudinal axis are opposite can be provided with non-supported regions which are not supported on the main body. The non-supported regions flex under the load of the rolling bodies rolling in or out, respectively, such that the rolling bodies run in and out smoothly, respectively. The raceway insert is preferably composed of hardened steel. The main body is preferably composed of non-hardened steel.

The sensory layer can have conductor paths from a nickel chromium alloy.

According to the principle of a strain gauge, the electrical resistance of the conductor paths varies when the latter are subjected to elongation or compression strain, respectively. The conductor paths mentioned preferably run in a meandering manner such that the former in the direction of measurement are very long. Alternatively, conductor structures from piezoresistive materials such as, for example, nickel-containing diamond-like hydrocarbons (Ni-DLC) or doped silicon can be present. Piezoresistive materials have a higher sensitivity to elongation than nickel chromium alloys, such that the length of the conductor structure in the direction of measurement can be embodied in a correspondingly shorter manner. The sensory layer can furthermore comprise a sublayer from a piezoelectric material that is preferably configured so as to be uninterrupted. The piezoelectric material can be provided with electrodes which are disposed such that the piezoelectric material can be set in oscillation. The respective sensor preferably operates according to the principle of surface acoustic waves (SAW). The sensory layer can furthermore have carbon or glass fibers.

It is a common feature of all the afore-described measuring principles that the thickness of the sensory layer is particularly small. The thickness of the sensory layer is preferably between 1 µm and 10 µm, and most preferably between 1 µm and 5 µm. A breakage of the sensory layer by virtue of this minor thickness is also not to be expected when the raceway insert by virtue of major external loads has a significant deformation.

Advantageous refinements and improvements of the disclosure are provided in the following description.

It can be provided that a first sensory layer is disposed on the first lateral face. The first sensory layer is thus fully load-bearing. It is nevertheless preferable for the sensory layer to specifically not measure those compressive forces that are transmitted by the former. Rather, deformations of the raceway insert which are aligned so as to be parallel with the direction of pressure and to be perpendicular to the longitudinal axis are to be measured.

The first sensory layer preferably extends transversely to the longitudinal axis, across the entire width of the first lateral face. The first lateral face can be provided with a recess, the depth of the latter being equal to or larger than the thickness of the sensory layer, wherein the sensory layer is disposed exclusively in the recess. On account thereof, the stress on the sensory layer can be reduced. The depth of the recess is between 1 µm and 10 µm, for example. However, with a view to an optimal rigidity of the guide carriage and with a view to the measuring accuracy it is preferable for the sensory layer to be fully bearing, wherein the latter is not disposed in a recess but rather on a planar first or second lateral face, respectively.

It can be provided that the raceway insert has a second lateral face that is configured so as to be separate from the first lateral face, wherein a second sensory layer is disposed on the second lateral face. This embodiment is to be considered for roller-shaped rolling bodies, for example, such as known from EP 2 110 571 B 1. A raceway insert here has in each case only a single first carriage raceway. By virtue of the preferred direction of measurement of the sensory layer it is in this case not necessary for the sensory layer to be disposed in the force path.

The second lateral face is preferably configured so as to be planar. Said second lateral face is preferably aligned so as to be parallel with the longitudinal axis. The first and the second lateral face are preferably disposed so as to be mutually inclined by between 75° and 105°, most preferably by 90°. The second sensory layer preferably extends transversely to the longitudinal axis, across the entire width of the second lateral face.

The sensory layer is preferably configured such that elongations of the raceway insert that arise in the respective assigned first or second lateral face, respectively, are capable of being measured. This is the case, for example, with a strain gauge which is attached to the respective lateral face, as has been explained above. By contrast, the sensor of DE 10 2008 051 682 A1 measures compressive forces which are transmitted by way of the sensor.

It can be provided that the raceway insert has a second carriage raceway which is disposed on that side of the raceway insert that is opposite the second lateral face, wherein the second carriage raceway is assigned a row of rolling bodies which are capable of being brought into rolling engagement with the second carriage raceway and an assigned second rail raceway on the guide rail, wherein the raceway insert is supported in a force-transmitting manner on the main body by way of the second lateral face. Thus, forces from the raceway insert are transmitted to the main body both by way of the first as well as by way of the second lateral face. A first or a second sensory layer, respectively, is preferably disposed in both lateral faces in each case. The respective rolling bodies are preferably configured so as to be spherical. A respective raceway insert, albeit without the sensory layer, is known from EP 2 952 761 A1, for example.

It can be provided that the first sensory layer is configured in such a manner that the compressive force which is transmitted by way of the second lateral face is capable of being measured by said first sensory layer, wherein the second sensory layer is configured in such a manner that the compressive force which is transmitted by way of the first lateral face is capable of being measured by said second sensory layer. As a result, it is measured how intensely the raceway insert is compressed or compressed by strain, respectively, by the forces that are transmitted by the rolling bodies. A material compression strain is preferably measured which is performed in the first or the second lateral face, respectively, that is assigned to the first or the second sensory layer, respectively, and which material compression strain is aligned so as to be perpendicular to the longitudinal axis.

It can be provided that the first and/or the second sensory layer are/is embedded between a respectively assigned first and second insulation layer in such a manner that said first and/or second sensory layer do/does not have any electrical contact with the raceway element and with the main body, wherein the first insulation layer is connected in a materially integral and direct manner to the assigned first or second lateral face, respectively. On account thereof, the sensory layer is electrically isolated from the main body and from the raceway element. By virtue of the minor thickness of the first and of the second insulation layer no breakage of these layers which could cause an electrical short circuit is to be expected even under load.

The first insulation layer is an $AL_2O_3$ or a $SiO_2$ layer, for example, which is applied to the assigned first or second lateral face, respectively, by the CVD method or by means of sputtering, for example. The sensory layer is preferably applied to the first insulation layer in a comparable manner, wherein said sensory layer is most preferably structured by the lithographic method and/or by the laser engraving method. The second insulation layer is preferably applied to the first insulation layer and to the sensory layer, wherein said second insulation layer is most preferably produced in the same manner as the first insulation layer. The first and/or the second insulation layer are/is preferably embodied in the form of uninterrupted layers. The thickness of the latter is in each case preferably between 1 µm and 10 µm, and most preferably between 1 µm and 5 µm. The sensory layers and the insulation layers can also be produced in an electrochemical manner.

It can be provided that the second insulation layer bears on the main body in a direct and force-transmitting manner, or is fixedly connected to said main body by way of an adhesive layer. The second insulation layer preferably extends across the entire force-transmitting region of the respectively assigned first or second lateral face, respectively.

The transmission of force between the raceway insert and the main body is preferably performed exclusively by way of the first and the second sensory layer and of the assigned first and second insulation layer. No transmission of load between the raceway insert and the main body is thus performed outside these layers.

It can be provided that the at least one sensory layer forms in each case at least two sensor elements, a separate sensor signal being acquirable at each of the latter. An even number of sensor elements is preferably provided. The sensor elements in relation to a plane which is aligned so as to be perpendicular to the longitudinal axis are preferably disposed distributed in a mirror-symmetrical manner. The sensor elements are in each case preferably provided with separate electrical connectors at which the sensor signal is acquirable. The electrical connectors are preferably disposed in the reigon of the above-mentioned non-supported regions of the raceway insert.

It can be provided that the at least two sensor elements in the direction of the longitudinal axis are disposed so as to be distributed along the assigned first or second lateral face, respectively. On account thereof, torques which act on the guide carriage can be measured.

It can be provided that the sensor elements are disposed beside one another so as to be free of any overlap. The production of the sensory layer is thus particularly simple. In particular, the sensory layer need not have any sublayers in order to enable conductor paths to cross. A void which with a view to the electrical isolation of the neighboring sensor elements is configured as small as possible can be present between the sensor elements.

It can be provided that in each case a third lateral face is disposed on the raceway insert so as to be transverse to the longitudinal axis and to be directly adjacent to the first and/or to the second lateral face, wherein the third lateral face is not supported on the main body, wherein the sensory layer extends in portions across the third lateral face. On account thereof, the sensitivity of the sensory layer can be enhanced without the production costs of the guide carriage increasing appreciably.

It can be provided that at least two sensor elements are disposed beside one another so as to be transverse to the longitudinal axis, wherein one of said sensor elements extends at least in portions across the third lateral face, wherein the other sensor element extends exclusively across the first or the second lateral face, respectively. On account thereof, a non-uniform distribution of elongation in the region of the sensory layer can be compensated. Only a single sensor element can also be provided so as to be transverse to the longitudinal axis, depending on the configuration of the raceway insert.

It is to be understood that the features mentioned above and yet to be explained hereunder are applicable not only in the combination stated in each case but also in other combinations or individually, without departing from the scope of the present disclosure.

BRIEF DESCRIPTION OF THE DRAWINGS

The disclosure will be explained in more detail hereunder by means of the appended drawings in which.

DETAILED DESCRIPTION

Figure 1:
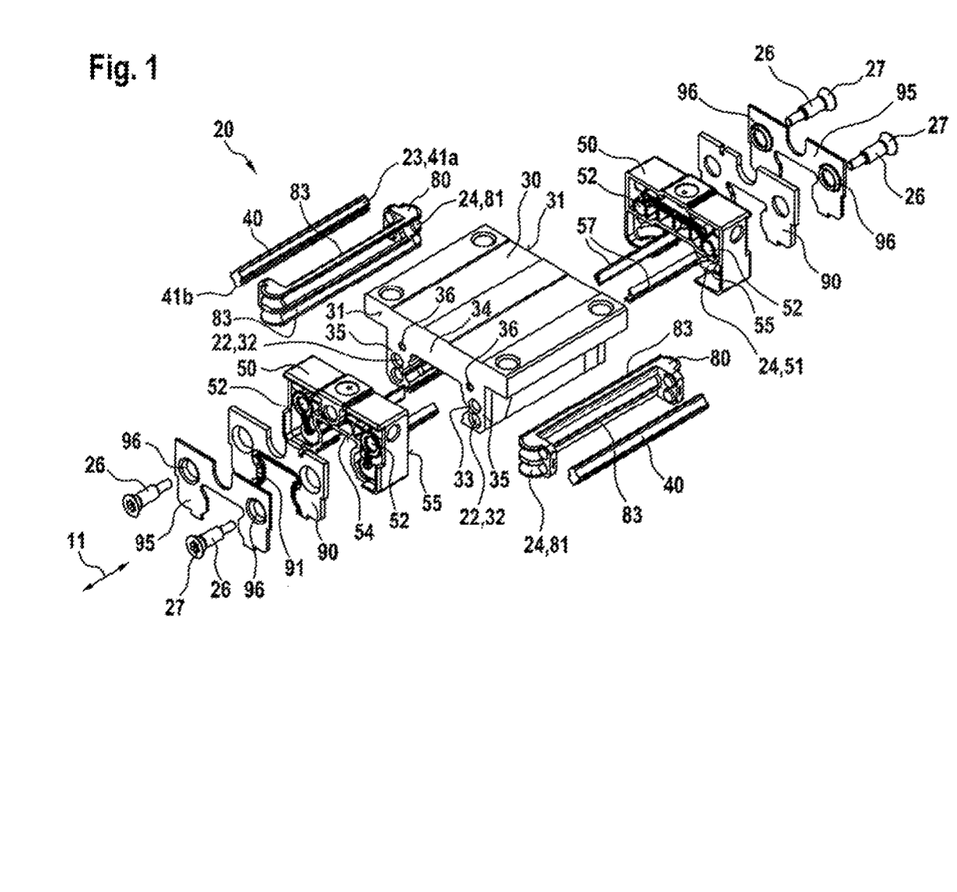
FIG. 1 shows an exploded view of a guide carriage according to the disclosure.

FIG. 1 shows an exploded view of a guide carriage 20 according to the disclosure. The guide carriage 20 comprises a main body 30 from non-hardened steel which by way of a substantially consistent U-shaped cross-sectional shape extends along a longitudinal axis 11. In each case one V-shaped groove 33 on which in each case one separate raceway insert 40 composed of hardened roller-bearing steel bears is disposed on the internal side of the U-legs 35. The two raceway inserts 40 by way of a substantially consistent cross-sectional shape extend along the longitudinal axis 11, wherein said two raceway inserts 40 each have two carriage raceways 41a; 41b such that the guide carriage 20 has a total of four rows of spherical rolling bodies (no. 21 in FIG. 2).

In each case one end cap 50 by way of an internal longitudinal end side 55 bears directly on the two opposite planar longitudinal end faces 31 of the main body 30. The two end caps 50 are of identical configuration, wherein the former are made from plastics using the injection-molding method. In each case one radially outward deflection surface 51 of a curved deflection channel 24 is provided in the two end caps for each of the four rows of rolling bodies. In each case two assigned ends of the two rolling body guide parts 80, on which the radially inward deflection surfaces 81 of the curved deflection channels 24 are provided, are inserted into the end cap 50.

A return channel 32 runs between the curved deflection channels 24 in the opposite end caps 50, said return channel 32 being presently configured directly in the main body 30 in the form of a circular bore which at both ends thereof is provided with a conical depression. However, the present disclosure is also usable for guide carriages in which the return channel is configured in a separate return tube or externally on the main body.

In each case two circular fastening bores 52 which extend along the longitudinal axis 11 are disposed in the end caps 50. The fastening bores 52 are each penetrated by one assigned fastening screw 26 which at the end side has an external thread which is screwed into an assigned internal thread 36 in the main body 30. The internal thread 36 is disposed approximately in the region of the transition between the base 34 and an assigned U-leg 35 of the main body 30, so that the two fastening screws 26 press the assigned end cap 50 across the entire internal longitudinal end face 55 uniformly against the longitudinal end face of the main body 30.

In each case one U-shaped end seal 90 which is configured substantially as a planar plate of consistent thickness bears on the external longitudinal end face 54 of the end cap 50, wherein said end seal 90 is composed of an elastomer, in particular a thermoplastic ether ester elastomer (TEEE, branded "Hytrel"). The end seal 90 is provided with an end lip seal 91 which bears in a sealing manner on the guide rail (no. 10 in FIG. 2).

In each case one U-shaped wiping plate 95 which is configured in the form of a planar plate of consistent thickness in turn bears externally on the end seal 90, wherein said wiping plate 95 is composed of stainless steel. The wiping plate 95 is configured so as to be equidistant from the guide rail at a minor spacing, such that the former can wipe foreign matter, for example metal shavings, from the said guide rail. The fastening screws 26 penetrate both the wiping plate 95 as well as the end seal 90. A conical head 27 of the fastening screw 26 herein bears on a depressed conical depression 96 on the wiping plate 95.

Furthermore to be considered are the rolling body retention webs 57 which are configured so as to be integral with the end caps 50, wherein said rolling body retention webs 57 extend between the U-legs 35 of the main body 30. The rolling body retention webs 57 of the two end caps 50 conjointly extend without gaps across the entire length of the main body 30.

Figure 2:
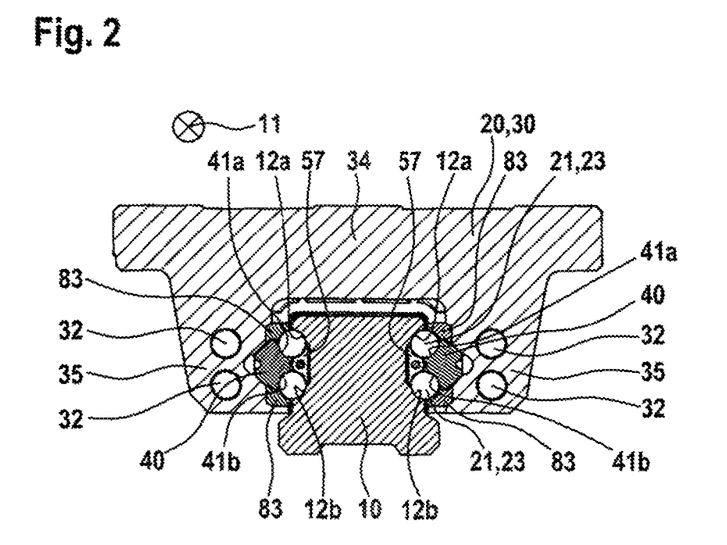
FIG. 2 shows a cross section of the guide carriage as per FIG. 1, having the assigned guide rail.

FIG. 2 shows a cross section of the guide carriage 20 as per FIG. 1, having the assigned guide rail 10. The sectional plane herein runs perpendicularly to the longitudinal axis 11 in the center of the main body 30.

The guide rail 10 is composed of steel and is edge-zone hardened in the region of the rail raceways 12a; 12b. Said guide rail 10, by way of the consistent cross-sectional shape illustrated, extends rectilinearly along the longitudinal axis 11. A total of four rail raceways 12a; 12b, which conjointly with the opposite carriage raceways 41a; 41b delimit the support portion 23 of the endless circulation channel, are arranged on the guide rail 10. The rolling bodies 21 in the support portion 23 roll on the respectively assigned carriage raceway 41a; 41b and on the respectively assigned rail raceway 12a; 12b. The rail raceways 12a; 12b and the carriage raceways 41a; 14b, when viewed in the cross section, are configured so as to be semicircular, wherein said raceways are adapted so as to have a tight fit on the spherical rolling bodies 21. Furthermore to be considered is the rolling body retention web 57 which holds the rolling bodies 21 conjointly with the guide portions 83 of the rolling body retention parts in the guide carriage 20 when the latter is not located on the guide rail 10.

Figure 3:
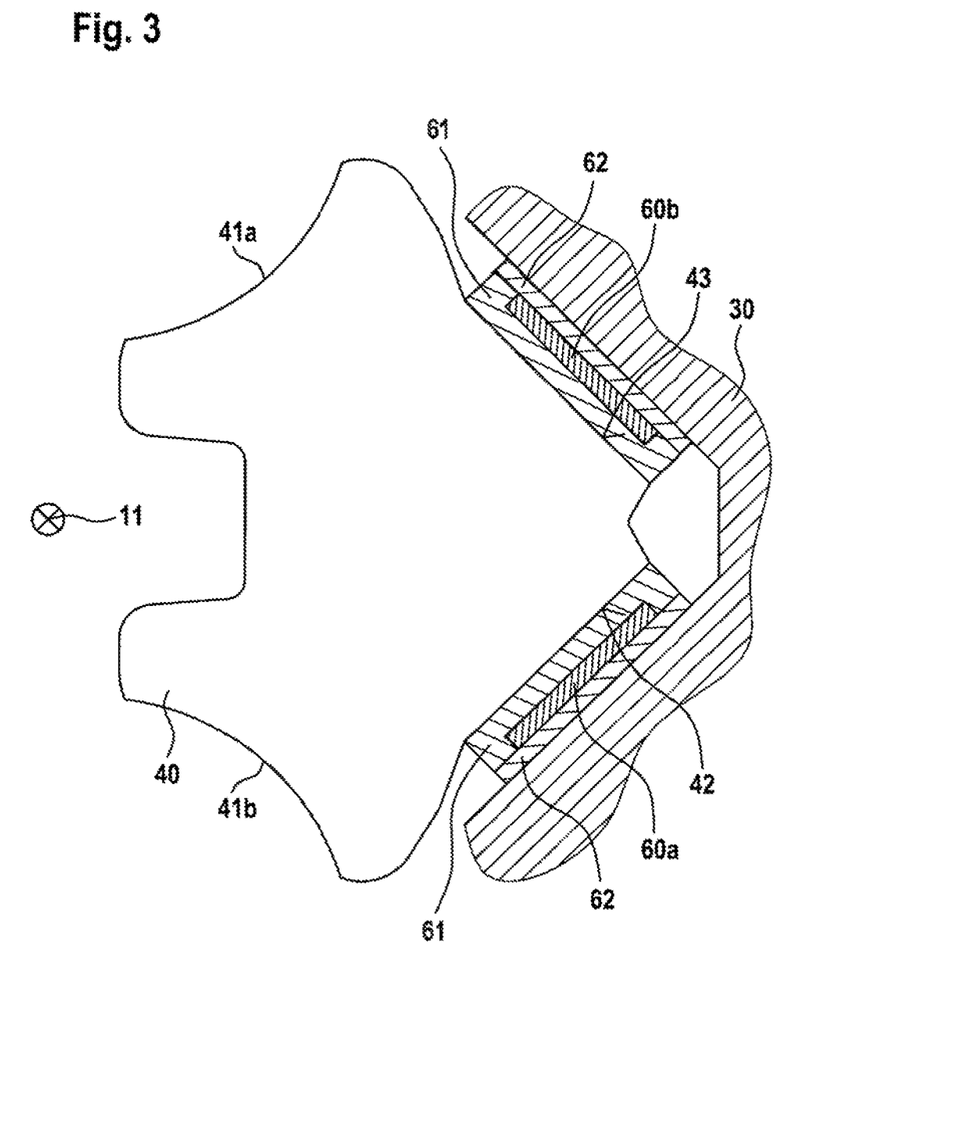
FIG. 3 shows a highly schematic partial cross section of the raceway insert and of the main body of the guide carriage as per FIG. 1.

FIG. 3 shows a highly schematic partial cross section of the raceway insert 40 and of the main body 30 of the guide carriage as per FIG. 1. The first and the second sensory layer 60a; 60b and the respectively assigned first and second insulation layer 61; 62 can be seen in particular. The thickness of these layers 60a; 60b; 61; 62 is illustrated in a highly exaggerated manner in FIG. 3. Said layers are in fact only a few micrometers in thickness.

The first lateral face 42 is configured so as to be planar and aligned so as to be parallel with the longitudinal axis 11. The first carriage raceway 41a is disposed on that side of the raceway insert 40 that is opposite the first lateral face 42. The first lateral face 42 is aligned so as to be approximately perpendicular to the load that acts on the first carriage raceway 41a during operation, wherein the respective line of pressure intersects the first lateral face 42. The same applies to the second lateral face 43 and to the second carriage raceway 41b. The first and the second lateral face 42; 43 are mutually disposed so as to be inclined at an angle of 90°. Accordingly, the force which is exerted by the rolling bodies on the first carriage raceway 41*a* causes a compression strain of the raceway insert 40 on the second lateral face 43 that is directed so as to be perpendicular to the longitudinal axis 11. The force which is exerted by the rolling bodies on the second carriage raceway 41*b* causes a compression strain of the raceway insert 40 on the first lateral face 42 that is directed so as be perpendicular to the longitudinal axis 11. The compression strains mentioned are measured by means of the respective assigned first or second sensory layer 60*a*; 60*b*, respectively, which are configured in a substantially mutually identical manner.

In each case one first insulation layer 61 is applied in a direct and materially integral manner without interruptions on the first or the second lateral face 42; 43, respectively. The first insulation layer 61 is an $AL_2O_3$ or a $SiO_2$ layer, for example, which is applied to the assigned lateral face 42; 43 by the CVD method or by means of sputtering for example. The sensory layers 60*a*; 60*b* are in each case an electrically conducting layer, wherein the electrically conducting regions are structured such that the desired measuring of elongation results. Two potential structures of the sensory layer 60*a*; 60*b* are shown in a purely exemplary manner in FIGS. 4 and 5. Many of the known sensory layers are configured as non-continuous layers such that in the view corresponding to FIG. 4 there are electrically non-conducting portions between the electrically conducting portions of the sensory layer 60*a*; 60*b*. It is preferred in the context of the present disclosure that the surface onto which the second insulation layer 62 is applied is substantially completely planar such that the second insulation layer 62 in turn has a planar load-transmitting surface. Accordingly, the sensory layer 60*a*; 60*b* is received in adapted depressions of the first insulation layer 61 that are produced in a photo-lithographic manner, for example. The uninterrupted second insulation layer 62 is produced in the same manner as the first insulation layer 61, wherein said second insulation layer 62 is applied to the first insulation layer 61 and to the sensory layer 60*a*; 60*b*. Accordingly, the sensory layer 60*a*; 60*b* is embedded between the first and the second insulation layer 61; 62 in such a manner that said sensory layer 60*a*; 60*b* has no electrical contact with the raceway element 40 and with the main body 30.

The second insulation layer 62 presently bears in a force-transmitting manner directly on a respectively assigned planar counter-face on the main body 30. The mentioned layers 60*a*; 60*b*; 61; 62 are fully load-bearing. No transmission of load between the raceway insert 40 and the main body 30 preferably takes place outside these layers 60*a*; 60*b*; 61; 62.

Figure 4:
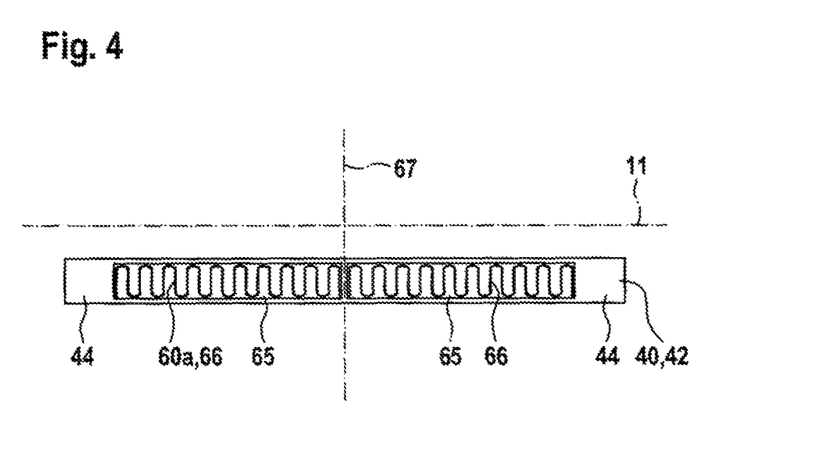
FIG. 4 shows a highly schematic view of a sensory layer of the guide carriage as per FIG. 1.

FIG. 4 shows a highly schematic view of a sensory layer 60*a* of the guide carriage as per FIG. 1. The first sensory layer 60*a* is illustrated in an exemplary manner, wherein the second sensory layer is configured so as to be substantially identical. The contour of the first lateral face 42 in a highly schematic manner is illustrated as a rectangle, wherein the drawing plane of FIG. 4 is disposed so as to be parallel with the first lateral face 42. The first lateral face 42 is configured so as to be elongate in the direction of the longitudinal axis 11. In each case one non-supported region 44 in which the raceway insert 40 is not supported on the main body is disposed at both ends of the first lateral face 42 which in relation to the longitudinal axis 11 are mutually opposite. This is illustrated in more detail in FIG. 5. The first lateral face 42 between the non-supported regions 44 is covered in a substantially complete manner by the first sensory layer 60*a*.

The first sensory layer 60*a* is configured so as to be mirror-symmetrical in relation to a plane of symmetry 67 which is aligned so as to be perpendicular to the longitudinal axis 11. It is to be noted herein that the entire guide carriage is preferably configured so as to be mirror-symmetrical in relation to this plane of symmetry 67. The sensory layer 60*a* presently has two sensor elements 65 which are disposed so as to be directly mutually adjacent, wherein said sensor elements 65 do not mutually overlap. The sensor elements 65 by virtue of the mirror symmetry mentioned above adjoin one another in the region of the plane of symmetry 67.

Each sensor element 65 has separate connector lines (no. 64 in FIG. 5) such that each of the former can emit a separate sensor signal. Each sensor element 65 is configured according to the principle of a strain gauge. Accordingly, each sensor element 65 has a meandering conductor path 66, the conductor portions of which run either perpendicularly or parallel to the longitudinal axis 11. The conductor path 66 is configured such that the line portions which run perpendicularly to the longitudinal axis 11 have a particularly great total length. Specifically, a particularly large number of line portions of this type which each extend across the entire width of the first lateral face 42 are present. Accordingly, a sensor element 65 measures an elongation or a compression strain, respectively, of the material on the second lateral face 42 that is aligned so as to be perpendicular to the longitudinal axis 11. The conductor paths 66 are preferably composed of a nickel chromium alloy such that the ohmic resistance of the conductor path 66 varies particularly intensively when the latter is subjected to an elongation or a compression strain, respectively.

The sensor signals of the two sensor elements 65 are preferably mathematically offset against one another in order for the total force and the total torque which act on the guide carriage to be determined. It is to be noted herein that both raceway inserts of the guide carriage are of identical configuration, wherein in each case two lateral faces having two sensor elements 65 each are present. Accordingly, the guide carriage has eight sensor elements 65 which are utilizable for calculating the total force and the total torque in terms of value and direction.

Figure 5:
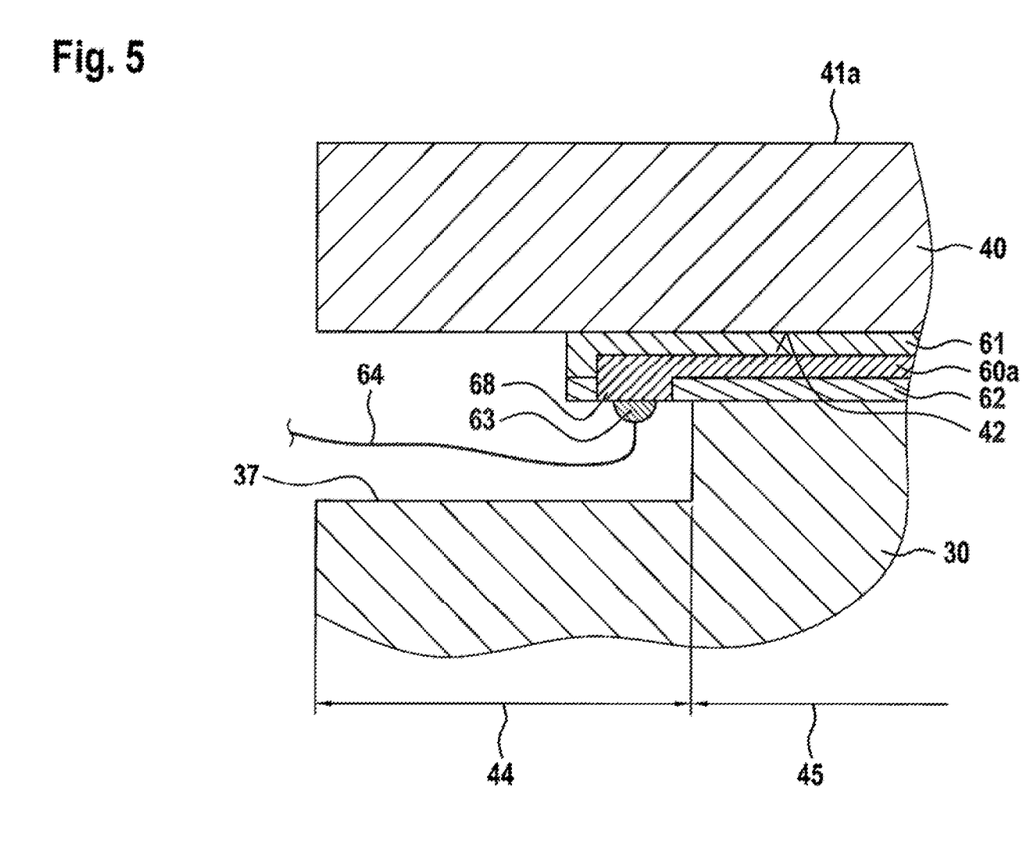
FIG. 5 shows a highly schematic partial longitudinal section of the raceway insert and of the main body of the guide carriage as per FIG. 1.

FIG. 5 shows a highly schematic partial longitudinal section of the raceway insert 40 and of the main body 30 of the guide carriage as per FIG. 1. The sectional plane is aligned so as to be parallel with the longitudinal axis and perpendicular to the first lateral face 42, wherein said sectional plane runs in an approximately centric manner in the first lateral face 42. The non-supported region 44 of the raceway insert 40 can be seen. The length of this region 44 corresponds to approximately 1 to 3 times the diameter of a rolling body. One region 44 of this type is provided in each case on both ends of the raceway insert 40 that in the direction of the longitudinal axis 11 are mutually opposite. The raceway insert 40, in particular the first lateral face 42, in this region 44 is not supported on the main body 30 such that said raceway insert 40 flexes under the load of the rolling body running in or out, respectively. On account thereof, the rolling bodies run in or out, respectively, in a particularly smooth manner. The first lateral face 42 is preferably configured so as to be planar across the entire length of the raceway insert 40 such that the layers 60*a*; 61; 62 can be produced in a particularly simple manner. The non-supported region 44 is formed by a clearance 37 in the main body 30 that provides the necessary void for the flexing of the raceway insert 40.

The connector lines 64 for the sensor elements (no. 65 in FIG. 4) are presently disposed in this clearance 37, wherein only a single connector line is illustrated in FIG. 5. However, each sensor element in the present embodiment has two connector lines. In order for the connector line 64 to electrically contact 63 the sensory layer 60*a*, a respective via 68 is provided in the second insulation layer 62. Said via 68 is disposed in a region of the second insulation layer 62 that extends into the non-supported region 44.

The length 45 of the raceway insert 40 that is supported in a force-transmitting manner is furthermore indicated in FIG. 5. This presently corresponds to the spacing of the two clearances 37 on the ends of the main body 30 that in the direction of the longitudinal axis are mutually opposite. The main body 30 in the region of the supported length 45 bears on the raceway insert 40 exclusively by way of the second insulation layer 62, such that the layers 60*a*, 61, 62 are fully load-transmitting. Since these layers 60*a*; 61; 62 are very thin and hard, the rigidity and the accuracy of the guide carriage is not substantially compromised on account of the aforesaid.

It is to be noted that the same conditions as shown for the first lateral face 42 in FIG. 5 are present on the second lateral face.

Figure 6:
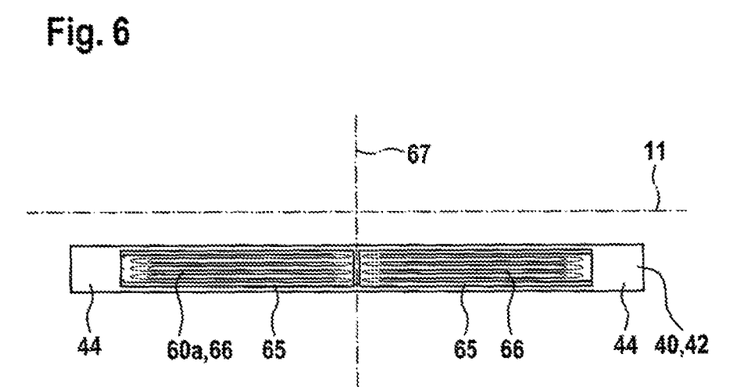
FIG. 6 shows a view corresponding to that of FIG. 4 of a second embodiment of the disclosure.

FIG. 6 shows a view corresponding to that of FIG. 4 of a second embodiment of the disclosure. The second embodiment differs from the first embodiment only in the configuration of the sensory layer 60*a*, such that reference otherwise is made to the explanations pertaining to FIGS. 1 to 5.

As in the case of the first embodiment, two second sensor elements 65 are likewise present. The measuring direction of the latter is now aligned so as to be parallel with the longitudinal axis 11. The respective meandering conductor paths 66 therefore have a particularly large number of line portions which in the direction of the longitudinal axis 11 extend across the entire length of the respective sensor element 65. The line portions which run parallel with the longitudinal axis 11 thus have a particularly great total length.

It is conceivable for the sensory layers according to the first and the second embodiment to be disposed on top of one another, wherein said sensory layers are mutually electrically isolated by a further insulation layer.

Figure 7:
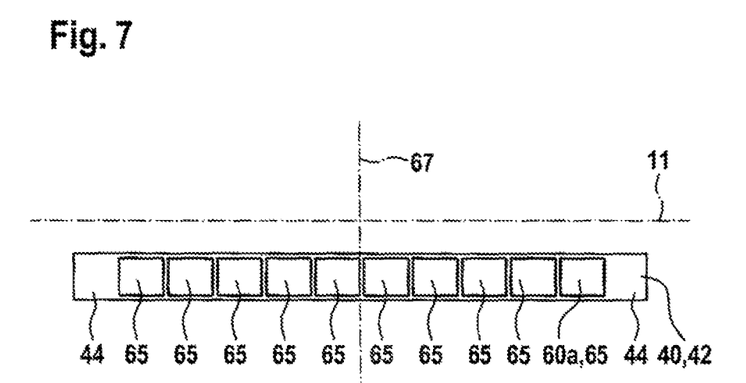
FIG. 7 shows a view corresponding to that of FIG. 4 of a third embodiment of the disclosure.

FIG. 7 shows a view corresponding to that of FIG. 4 of a third embodiment of the disclosure. The third embodiment differs from the first embodiment only in the number of sensor elements 65, such that reference otherwise is made to the explanations pertaining to FIGS. 1 to 5.

Ten mutually identical sensor elements 65 are presently provided, wherein another number is also utilizable. An even number of sensor elements 65 is preferably used.

As is the case in the first embodiment, the conductor path is configured so as to be meandering, wherein said conductor path has fewer line portions which run perpendicularly to the longitudinal axis 11, in order to take into account the smaller length of the respective sensor element 65 in the direction of the longitudinal axis 11.

It is to be understood that the sensor elements 65 can operate based on any other known measuring principle by means of which expansions or compression strains, respectively, of material are capable of being measured in the respective lateral face.

Figure 8:
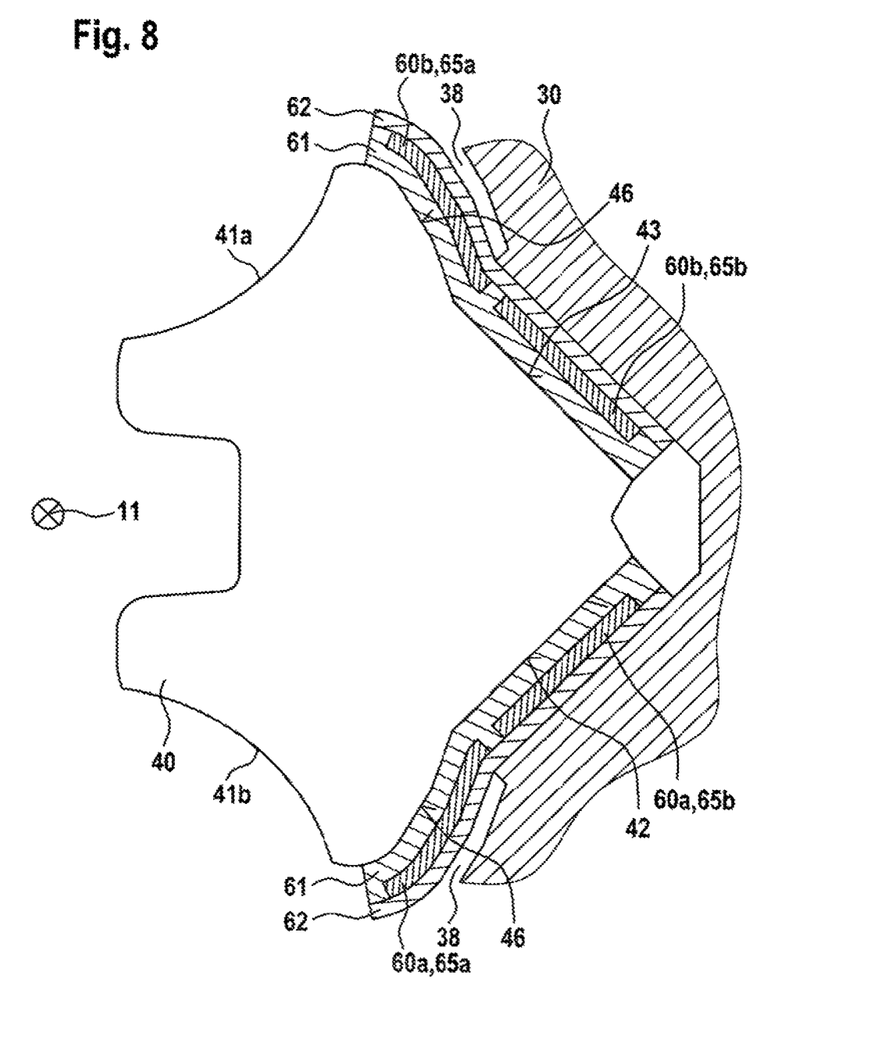
FIG. 8 shows a view corresponding to that of FIG. 3 of a fourth embodiment of the disclosure.

FIG. 8 shows a view corresponding to that of FIG. 3 of a fourth embodiment of the disclosure. The fourth embodiment, with the exception of the points of differentiation described hereunder, is configured so as to be identical to the first embodiment, such that reference in this respect is made to the explanations pertaining to FIG. 1 to 5. Identical or equivalent parts are identified using the same reference signs in FIGS. 1 to 5 and 8.

A third lateral face 46 which does not bear on the main body 30 is disposed in each case transversely to the longitudinal axis 11 so as to be directly adjacent to the first and to the second lateral face 42; 43. In each case one void 38 which has an approximately consistent width is provided between the third lateral face 46 and the main body 30. The third lateral face 46 is configured so as to be curved in a convex manner. It has been demonstrated that material expansions which are substantially different from those in the region of the first or the second lateral face 42; 43, respectively, can arise in the region of the third lateral face 46. In particular, material expansions can be present in the region of the third lateral face 46, wherein material compression strains can be present on the first or the second lateral face 42; 43, respectively.

The sensory layers 60*a*; 60*b* and the insulation layers 61; 62 in each case extend also onto the third lateral face 46. In order to take into account any potential non-uniform distribution of elongation, two sensor elements 65*a*; 65*b* are disposed beside one another so as to transverse to the longitudinal axis 11. It is to be considered herein that according to FIG. 4 two sensor elements are also disposed beside one another in the direction of the longitudinal axis 11. The sensory layers 60*a*; 60*b* thus form in each case four sensory elements which are preferably of substantially mutually identical configuration. However, the width of the two sensor elements 65*a*; 65*b* can be chosen to be dissimilar. The sensor element 65*b* extends exclusively across the first or the second lateral face 42; 43, respectively. The sensor element 65*a* extends across the third lateral face 65, wherein said sensor element 65*a* can also protrude into the first or the second lateral face 42; 43, respectively.

LIST OF REFERENCE SIGNS

10 Guide rail
11 Longitudinal axis
12*a* First rail raceway
12*b* Second rail raceway
20 Guide carriage
21 Rolling body
22 Circulation channel
23 Support portion
24 Deflection channel
26 Fastening screw
27 Head of the fastening screw
30 Main body
31 Longitudinal end face of the main body
32 Return channel
33 V-shaped groove
34 Base
35 U-leg
36 Internal thread
37 Clearance
38 Void
40 Raceway insert
41*a* Carriage raceway
41*b* Second carriage raceway
42 First lateral face
43 Second lateral face
44 Unsupported region 45 Force-transmitting supported length of the raceway insert
46 Third lateral face
50 End cap
51 Radially outward deflection surface
52 Fastening bore
55 Inner longitudinal end face of the end cap
57 Rolling body retention web
60a First sensory layer
60b Second sensory layer
61 First insulation layer
62 Second insulation layer
63 Contact
64 Connector line
65 Sensor element
65a Sensor element
65b Sensor element
66 Meandering conductor path
67 Plane of symmetry
68 Via
80 Rolling body guide part
81 Radially inward deflection surface
83 Guide portion
90 End seal
91 End lip seal
95 Wiping plate
96 Depression

What is claimed is:

1. A guide carriage for use with a guide rail, the guide carriage comprising:
a main body; and
at least one separate raceway insert, wherein:
a first carriage raceway that extends parallel to a longitudinal axis is disposed on the at least one separate raceway insert, said first carriage raceway assigned a first lateral face which is disposed on a side of the at least one separate raceway insert that is opposite the first carriage raceway,
the first carriage raceway is assigned a row of rolling bodies configured to be brought into rolling engagement with the first carriage raceway and an assigned first rail raceway on the guide rail,
the at least one separate raceway insert is supported in a force-transmitting manner on the main body by the first lateral face,
the at least one separate raceway insert has at least one sensory layer which in the direction of the longitudinal axis extends across at least 80% of a length of the at least one separate raceway insert which is supported in the force-transmitting manner on the main body,
a first sensory layer of the at least one sensory layer is disposed on the first lateral face,
the at least one separate raceway insert has a second lateral face that is configured so as to be separate from the first lateral face, and
a second sensory layer of the at least one sensory layer is disposed on the second lateral face.

2. The guide carriage according to claim 1, wherein:
the at least one separate raceway insert has a second carriage raceway which is disposed on a side of the at least one separate raceway insert that is opposite the second lateral face,
the second carriage raceway is assigned a row of rolling bodies configured to be brought into rolling engagement with the second carriage raceway and an assigned second rail raceway on the guide rail, and
the at least one separate raceway insert is supported in a force-transmitting manner on the main body by the second lateral face.

3. The guide carriage according to claim 2, wherein:
the first sensory layer is configured to measure a compressive force transmitted by the second lateral face, and
the second sensory layer is configured to measure a compressive force transmitted by the first lateral face.

4. The guide carriage according to claim 1, wherein:
at least one of the first sensory layer and the second sensory layer is embedded between a respectively assigned first and second insulation layer such that the at least one of the first and second sensory layer does not have any electrical contact with the raceway element and with the main body, and
the first insulation layer is connected in a materially integral and direct manner to the assigned first or second lateral face, respectively.

5. The guide carriage according to claim 4, wherein:
the second insulation layer bears on the main body in a direct and force-transmitting manner.

6. The guide carriage according to claim 4, wherein:
the second insulation layer is fixedly connected to said main body by an adhesive layer.

7. The guide carriage according to claim 1, wherein:
each sensory layer of the at least one sensory layer forms at least two sensor elements, and
a separate sensor signal is acquirable at each of the sensor elements.

8. The guide carriage according to claim 7, wherein:
the at least two sensor elements in the direction of the longitudinal axis are disposed so as to be distributed along the assigned first or second lateral face, respectively.

9. The guide carriage according to claim 7, wherein:
the sensor elements are disposed beside one another so as to be free of any overlap.

10. The guide carriage according to claim 7, wherein:
a third lateral face is disposed on each insert of the at least one separate raceway insert so as to be transverse to the longitudinal axis and to be directly adjacent to at least one of the first lateral face and the second lateral face,
the third lateral face is not supported on the main body, and
the sensory layer extends in portions across the third lateral face.

11. The guide carriage according to claim 10, wherein:
at least two sensor elements are disposed beside one another so as to be transverse to the longitudinal axis,
one of said sensor elements extends at least in portions across the third lateral face, and
the other sensor element extends exclusively across the first or the second lateral face, respectively.

* * * * *